United States Patent
Aubriet et al.

(10) Patent No.: US 7,669,936 B2
(45) Date of Patent: Mar. 2, 2010

(54) PADDED COVERING FOR A CHAIR

(75) Inventors: Cecile Aubriet, Strasbourg (FR);
Jean-Marc Schneider, Sarrebourg (FR);
Sylvain Meneghini, Sarrebourg (FR)

(73) Assignee: Steelcase SA, Schiltigheim (FR)

( * ) Notice: Subject to any disclaimer, the term of this patent is extended or adjusted under 35 U.S.C. 154(b) by 118 days.

(21) Appl. No.: 11/578,580

(22) PCT Filed: Jan. 31, 2005

(86) PCT No.: PCT/FR2005/000198

§ 371 (c)(1),
(2), (4) Date: Oct. 16, 2006

(87) PCT Pub. No.: WO2005/110807

PCT Pub. Date: Nov. 24, 2005

(65) Prior Publication Data

US 2007/0210626 A1    Sep. 13, 2007

(30) Foreign Application Priority Data

Apr. 22, 2004  (FR) .................................. 04 04299

(51) Int. Cl.
*A47C 7/02* (2006.01)
(52) U.S. Cl. ............................ 297/452.56; 112/475.08; 5/652; 5/653
(58) Field of Classification Search ................. 297/244, 297/228.11, 219.1, 218.1, 452.64, 452.63; 5/652.1, 652, 655.7; 112/153, 475.08, 470.27, 112/163
See application file for complete search history.

(56) References Cited

U.S. PATENT DOCUMENTS

| | | | | |
|---|---|---|---|---|
| 3,381,999 A | * | 5/1968 | Steere, Jr. | 297/452.47 |
| 3,638,255 A | * | 2/1972 | Sterrett | 5/641 |
| 4,547,920 A | * | 10/1985 | Hulsebusch et al. | 297/256 |
| 4,550,046 A | * | 10/1985 | Miller | 428/116 |
| 4,686,724 A | * | 8/1987 | Bedford | 5/652.1 |
| 4,843,664 A | * | 7/1989 | Farnworth et al. | 5/417 |
| 4,851,070 A | * | 7/1989 | Shimada | 156/293 |
| 5,274,846 A | * | 1/1994 | Kolsky | 2/460 |
| 5,413,837 A | * | 5/1995 | Rock et al. | 428/192 |

(Continued)

FOREIGN PATENT DOCUMENTS

DE         102 18 004 B3     1/2004

(Continued)

*Primary Examiner*—David Dunn
*Assistant Examiner*—James Alex
(74) *Attorney, Agent, or Firm*—Oliff & Berridge, PLC

(57) ABSTRACT

A padded covering for parts of a chair, consisting of a padded material (2) with elastic properties at least within the thickness thereof, and covered with a semi-transparent, perforated mesh fabric, wherein said padded material has a three-dimensional structure that is at least partially visible through said fabric and comprises recesses opening out onto the fabric (3). Said covering is produced via a method comprising the steps of cutting out a suitably-shaped piece capable of covering the specific chair portion; stitching at least two concentric lines at the edges and over the entire periphery of the piece in order to flatten the edge region; cutting out, in a semi-transparent perforated mesh fabric (3), a correspondingly-sized piece; placing said semi-transparent fabric piece on top of the padded piece; and fastening the piece.

8 Claims, 2 Drawing Sheets

U.S. PATENT DOCUMENTS

Figure 1:
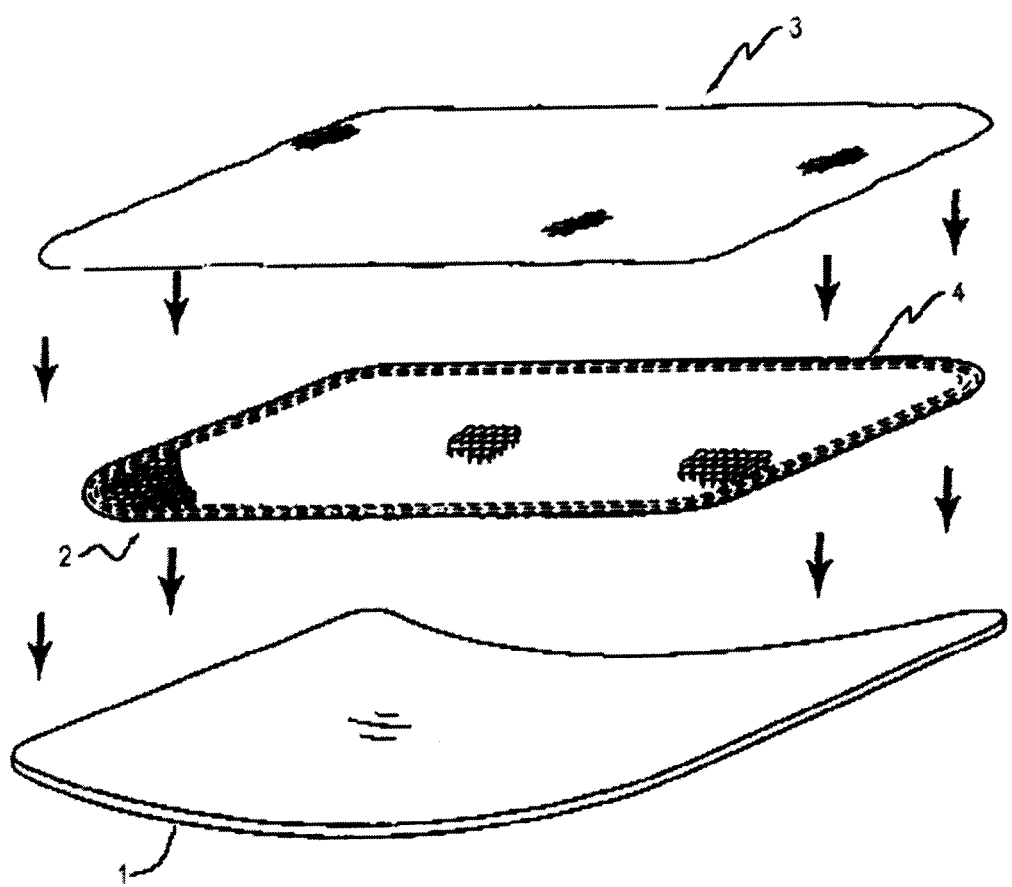

| | | | |
|---|---|---|---|
| 5,416,935 A * | 5/1995 | Nieh | 5/423 |
| 5,478,134 A * | 12/1995 | Bernard et al. | 297/218.1 |
| 5,527,091 A * | 6/1996 | Gruber | 297/188.01 |
| 5,749,111 A * | 5/1998 | Pearce | 5/652 |
| 5,870,785 A * | 2/1999 | Hoorens | 5/652.1 |
| 5,974,607 A * | 11/1999 | Smith | 5/636 |
| 6,009,578 A * | 1/2000 | Davis | 5/653 |
| 6,056,278 A * | 5/2000 | Bullard et al. | 267/91 |
| 6,616,240 B1 * | 9/2003 | Theosabrata et al. | 297/452.64 |
| 6,760,937 B1 * | 7/2004 | Ou | 5/652.1 |
| 7,326,455 B2 * | 2/2008 | Hsieh | 428/52 |
| 7,334,280 B1 * | 2/2008 | Swartzburg et al. | 5/724 |
| 2003/0098598 A1 | 5/2003 | English et al. | |
| 2005/0264057 A1 * | 12/2005 | Huse | 297/228.11 |
| 2006/0022506 A1 * | 2/2006 | Chan | 297/452.63 |
| 2006/0061160 A1 * | 3/2006 | Liou | 297/219.1 |
| 2007/0271704 A1 * | 11/2007 | Breeland | 5/653 |

FOREIGN PATENT DOCUMENTS

| | | |
|---|---|---|
| EP | 0 355 879 A2 | 2/1990 |
| EP | 0 791 555 A1 | 8/1997 |
| EP | 1 203 655 A1 | 5/2002 |
| JP | A 2002-211298 | 7/2002 |
| WO | WO 02/102585 A1 | 12/2002 |

* cited by examiner

PADDED COVERING FOR A CHAIR

The present invention relates to a method for manufacturing a padded cover designed to cover seat parts, for example seatbacks, headrests, or armrests as well as a method for assembling said padded cover to a rigid or semi-rigid support forming the frame of said seat part. Finally, the invention also relates to the padded cover subject of the above processes, as well as supports of seat parts covered with such padded covers.

The use of padded covers to cover seat parts is not new and has given rise to numerous upholstering techniques. Upholstered padded covers have in particular been used for a long time in the area of office furniture to render the seats more comfortable in view of the more intensive utilization that is common in the workplace.

The cover of the invention is, in tradition fashion, based on a padded material with elasticity at least in its thickness direction, for example three-dimensional structure foam. The actual structure of the materials employed in the invention, particularly the texture of the fabric which, in the invention covers the material used for stuffing, has however advantages that did not exist in the upholstery used heretofore for covering seats.

The way in which the various components of the cover according to the invention are then worked to improve the manufacturing process technically and financially then facilitate its mounting on the seat is also original in several features, and affects the comfort afforded to the user.

Finally, the structure of the various components of the cover according to the invention results in an assembly that is particularly esthetic per se, and offers numerous options for appearance variation by simply changing the structural features of said components.

In the first place, the invention relates, as indicated above, to a method of manufacturing a padded cover designed to cover seat parts, characterized by consisting of:

cutting out, from a padded material of the three-dimensional foam type having elasticity at least in its thickness direction, a shaped piece adapted to cover the part of the seat to be covered;
  at the borders of said piece, stitching at least two concentric lines along the entire periphery of the piece in order to flatten the border area;
  cutting out, from a semi-transparent openwork mesh fabric, a piece with dimensions corresponding to those of the padded piece;
  placing the piece made of semi-transparent fabric on top of the padded piece; and
  fastening the piece made of semi-transparent fabric to the padded piece at the flattened peripheral stitching area.

From the purely manufacturing standpoint, the existence of the flattened area at the border of said padded material facilitates fastening the piece of semi-transparent fabric because it confers greater structural stability thereon. The stitched area actually eliminates to a large degree the elastic thickness of the padded material, whose absence of rigidity makes a traditional method of fastening a fabric cover difficult since said fastening imposes constraints that oppose the elasticity of the material.

Preferably, to perfect the flattening of this peripheral area, the padded piece is in fact provided with a plurality of concentric stitching lines at its borders, the number of which is generally between five and ten.

The more complete or the tighter the coverage of this area by stitching lines, the more compressed and stable it is, and thus the more able it is to receive the cover fabric under good conditions from the fastening standpoint.

Looked at strictly in financial terms, these conditions evidently tend to render the fastening operation as fast as possible, which is possible only if the ground is properly prepared for intervention of the fastening means. The reduction in time is equivalent, in terms of industrial process, to a cost reduction and is thus in the right direction.

According to one option, the padded part has a three-dimensional structure based on adjacent tubes extending axially along the thickness of the padded material.

This structure, which is not novel in itself, is highly favorable to its application in the invention because, for obvious reasons of comfort, padded covers must essentially have elasticity in the direction in which they are stressed, i.e. perpendicularly to their outer resting surface. The tubes of the structure chosen, which extend in the direction of the thickness of the material, are thus also in a perpendicular direction to the resting surface, whether the cover of the invention is used in a headrest, a seatback an armrest, or another part.

Still according to the method of the invention, the piece of semi-transparent fabric covers the free edges of the walls delimiting the adjacent tubes at the outlets of the recesses that these tube constitute.

This feature has three advantages: in purely functional terms, the interstices created by the meshes, which in this case are not tight and have an openwork configuration, are disposed at the outlets of said tubes. In other words, the fabric piece only partially obstructs the openings of said tubes allowing the material to "breathe" under optimal conditions.

The dust particles deposited on the mesh cover fabric which, depending on its color, may be visible, can moreover be trapped inside the tubes once they have passed through said tight mesh.

Finally, this design has an advantageous esthetic aspect because the semi-transparent fabric reveals the structure of the three-dimensional padded piece and in particular suggests the section of the adjacent tubes. Depending on their shape and the color pattern used, the whole appears to be three-dimensional, giving the product an undeniably original appearance.

Preferably, the free edges of the walls delimiting the tubes can form identical adjacent motifs repeating over the entire surface to be covered by the semi-transparent fabric. Still more specifically, said adjacent motifs can have a honeycomb configuration.

This honeycomb structure can be at least partially visible through the fabric piece, with shades that depend on the choice of color for both the mesh fabric cover and for the synthetic material of which the padded part is made. Thus it is possible to create contrasts by using visually opposed colors (for example black for the mesh fabric and white for at least the free ends of the adjacent tubes) or even to create pictures or logos by coloring certain tubes.

The compression of the borders of the padded piece by stitching prior to fastening the mesh fabric not only has the advantage of facilitating this fastening process. It also enables the padded covers thus manufactured to be joined to supports forming the core of the seat elements to which they are applied.

The invention also relates to such a method for joining a padded cover to a rigid or semi-rigid support structure, for example a seatback, headrest, or armrest, characterized by consisting of:

manufacturing a padded cover having peripheral stitching lines whose shape corresponds essentially to that of the support, the innermost line being located such that it approximately follows the contour of said support;

disposing the padded cover on the front face of the support to be covered, centering it inside the flattened area of the stitching lines;

folding the flattened borders around the stitching lines around the edges of the support to apply them to the rear face of said support;

fastening said flattened borders to the rear face of the support.

The flattened peripheral area has more flexibility and suppleness than the central area, in which the padded material is unaffected by the stitching. This improved flexibility facilitates the folding of the borders around the rigid support; hence the importance of this higher-flexibility area corresponding substantially to the periphery of the support and for centering to be possible with respect to this area.

Improving the flexibility by flattening the peripheral border is not enough, however. In this area, elimination of elasticity in the thickness direction renders the material uncomfortable when one presses against it. Hence, said flattened edge must not extend over a peripheral portion of the front face of the support, more particularly or even exclusively designed to be covered with the padded cover. Centering must then be effected preferably with respect to the internal stitching line.

The options for mechanical fastening to the rear face of the support are of course many. Preferably, according to the invention, the flattened borders are stapled to said rear face.

Such stapling is an easily automatable and rapid operation, hence financially favorable.

The invention also relates to a padded cover for covering the aforesaid seat parts, which cover has the features enabling it to exhibit the advantages referred to above and to be implementable in the processes described above.

For the record, this cover is made principally of a padded material with elasticity at least in its thickness direction, for example of the foam type, covered with a semi-transparent openwork mesh fabric, the padded material having a three-dimensional structure at least partially visible through said fabric and having recesses whose outlets are in contact with the fabric.

Preferably, this three-dimensional structure is comprised of tubes extending axially in the thickness direction of the material and whose free edges, in contact with the mesh fabric, form identical motifs developing over the entire surface of the padded material.

Once more, in addition to the esthetic advantage of this configuration, it to some degree traps particles that would otherwise be visible on the upholstery fabric, and improves the ability of the cover to breathe.

According to a particularly suitable option, it leads to excellent mechanical strength, as the repeating motifs of the free edges of the tubular structure can have a honeycomb configuration.

For implementation of the processes considered above, the borders of the padded material are flattened by at least two concentric stitching lines, and the mesh fabric is fastened to said material in this stitching area.

The flattening of the peripheral edge, which makes an essential contribution to said method, is of course optimal if based on a plurality of stitching lines. However, a compromise must be found between mechanical efficiency, which in principle is higher with a larger number of lines, and the financial necessity of reducing this number. In practice, the number of lines is less than ten and in general between five and ten, as mentioned above.

Preferably, the mesh fabric is fastened to the padded material by welding, for example ultrasonic welding.

Such a fastening means is fully compatible with the financial imperatives that are favored during manufacture, as in particular it is easy to automate.

The invention finally relates to resting supports able to form parts of seats, of the seatback, headrest, or armrest type, characterized by being composed of:

a rigid or semi-rigid support;

a padded foam-type material having elasticity at least in its thickness direction, and having a three-dimensional structure provided with recesses;

a semi-transparent openwork mesh fabric covering one face of the padded material in contact with the openings of said recesses;

whereby the padded material and the semi-transparent fabric form a padded cover designed to cover one side of the support structure.

The three-dimensional structure is that of the padded material, and is hence comprised of adjacent tubes extending axially along the thickness of the material, whose free edges delimit openings and form identical motifs that repeat over the entire surface of the padded material in contact with the semi-transparent fabric, in order for example to form a honeycomb configuration.

While much has been said about the semi-transparent mesh fabric, it goes without saying that the fabric, constituting the outer protective cover of the padded pieces, should not be made with meshes that are too loose because it would no longer play its protective, tensioning role. The esthetic effect would in any event probably be disadvantageous.

This is why the open meshes in fact have small-dimension openings, approximately 0.1 to 0.5 mm.

According to one option, the mesh fabric and the padded three-dimensional structure are made of polyester.

The invention will now be described in greater detail with reference to FIGS. 1 and 2 attached.

This drawing shows the composition of a seatback covered with a padded cover according to the present invention.

The support (1) to which said cover is applied is in the form of a shell made of plastic for example curved to adapt in particular to the shape of a user's back. The shell comprising this support (1) is small in thickness (a few millimeters) giving it some flexibility. Indeed it can be deformed when it is flexed transversally. This flexibility is needed to provide a certain comfort level.

The subject of the invention is in fact comprised of the padded material (2) that surmounts said support, combined with a fabric (3) of semi-openwork mesh designed to cover the padded material (2). The latter is made of a synthetic material having a honeycomb structure, the cells of which develop axially along the thickness of the pad.

Said honeycomb configuration has a plurality of adjacent tubes whose free edges form identical motifs of hexagonal shape. This tubular honeycomb structure is known per se. At least in its thickness direction, it possesses elasticity aimed at enhancing the comfort of the padded cover according to the invention in its function of supporting a part of the body. In particular the honeycomb structure, due to its particular geometry, is known for offering excellent support for example to the user's back, combining both firmness and flexibility to achieve maximum comfort.

The periphery of the padded material (2) has several concentric stitching lines (4). The fact of stitching this peripheral area provides the padded material (2) with flattened borders so that the central area preserves its tubular structure and hence has a certain thickness.

The flattened peripheral area is advantageous for several reasons. In the first place, it confers greater flexibility enabling the padded material (2) to be fastened to the support (1) under conditions that will be described in detail hereinbelow. In the second place, the existence of peripheral borders facilitates fastening the mesh fabric (3) to the padded material (2) due to the increased stability of the borders. Fastening the former to the latter is actually confined to this area, so that the padded cover according to the invention, composed of the padded material (2) and the openwork mesh fabric (3), has cohesion by fastening only in its peripheral area.

First, according to the invention, the padded material (2) and fabric (3) are joined to each other, preferably by welding, for example ultrasonic welding.

The flattened peripheral area which, as already stated, is far more flexible than the central area, is then bent around the edges of support (1) which is fastened to the rear face of said support (1). This fastening is done by stapling for example, although other mechanical methods are also possible.

After this fastening step, only the padded part of the cover thus constituted is on the front face of the rigid support (1), because positioning of the interior stitching line, which defines the centering area, takes on essentially the outside dimensions of support (1). The flattened part is hence almost exclusively intended to be folded around the edges of support (1).

As can be seen from the drawing, the meshes of fabric (3) are placed at the outlets of the tubes of the padded structure (2).

This also enables the cover to breathe, and to trap any microparticles of the dust type that may creep into said tubes through the interstices of said meshes. This dust is then no longer visible at the surface, contributing to a more presentable appearance of the cover according to the invention under all circumstances.

Finally, the combination of the mesh fabric and the three-dimensional structure of the padded material has in itself an undeniable esthetic advantage. This can be enhanced by color patterning, for example when the color chosen for the openwork fabric is different from that selected for the three-dimensional foam (2), or at least for its free edges that contact said fabric (3). Hence it is possible to change the color contrasts, and even improve the esthetic effects still further by using different colors for the three-dimensional structure disposed behind the mesh fabric (3) so that logos, pictures, etc. can show through.

Figure 2:
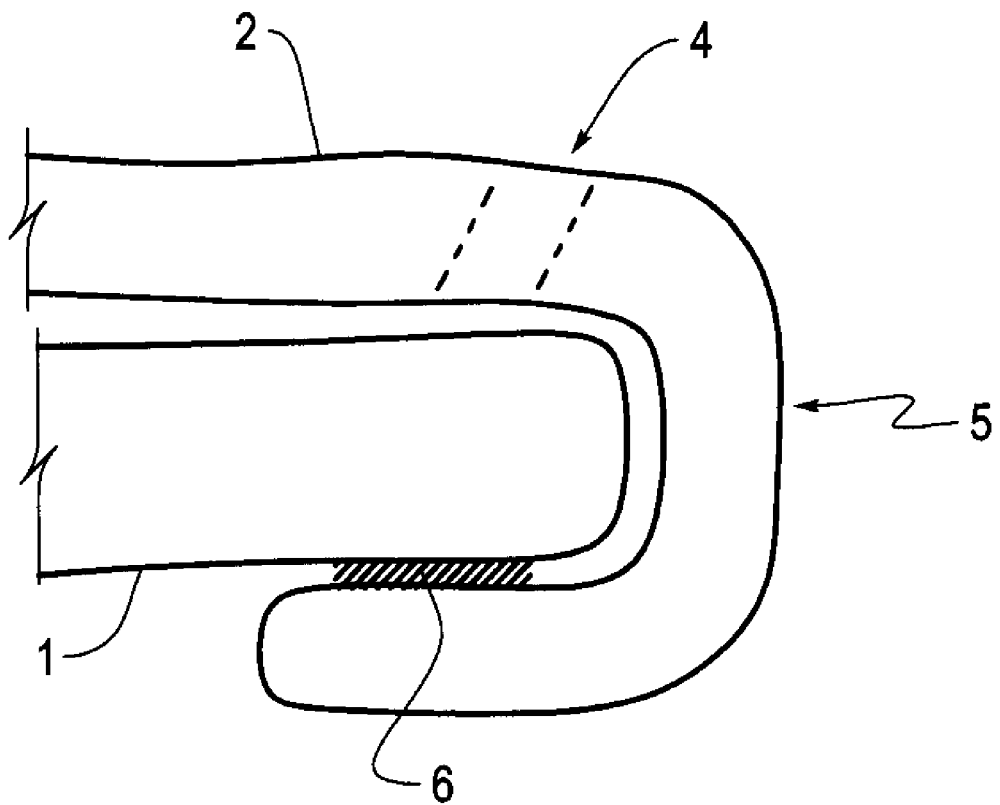

FIG. 2 illustrates an example of the method of joining a padded material 2 to a rigid or semi-rigid support 1. As illustrated, a border portion 5 is folded over support 1. The border portion 5, surrounding stitching lines 4, is fastened to support 1 by means of a fastener 6.

The invention claimed is:

1. A method of manufacturing a padded cover designed to cover seat parts, comprising:
    cutting out, from a three-dimensional foam padded material having elasticity at least in its thickness direction, a shaped piece adapted to cover the part of the seat to be covered;
    at the borders of said piece, stitching at least two concentric lines along the entire periphery of the piece in order to flatten the border area;
    cutting out, from a semi-transparent openwork mesh fabric, a piece with dimensions corresponding to those of the padded piece;
    placing the piece made of semi-transparent fabric on top of the padded piece; and
    fastening the piece made of semi-transparent fabric to the padded piece at the flattened peripheral stitching area.

2. The method of manufacturing a padded cover according to claim 1, wherein the padded piece is covered with a plurality of concentric stitching lines at its borders.

3. The method of manufacturing a padded cover according to claim 1, wherein the padded piece has a three-dimensional structure based on adjacent tubes extending axially along the thickness of the padded material.

4. The method of manufacturing a padded cover according to claim 3, wherein the piece made of semi-transparent fabric covers the free edges of the walls delimiting the adjacent tubes, at the outlets of the recesses that the tubes constitute.

5. The method of manufacturing a padded cover according to claim 4, wherein the free edges of the walls delimiting the tubes form identical adjacent motifs repeating over the entire surface to be covered by the semi-transparent fabric.

6. The method of manufacturing a padded cover according to claim 5, wherein said adjacent motifs have a honeycomb configuration.

7. A method of assembling a padded cover to a rigid or semi-rigid support of a seatback, headrest, or armrest, comprising:
    manufacturing by the method according to claim 1, the padded cover having peripheral stitching lines whose shape corresponds essentially to that of the support, the innermost line being located such that it approximately follows the contour of said support;
    disposing the padded cover on the front face of the support to be covered, centering it inside the flattened area of the stitching lines;
    folding the flattened borders around the stitching lines around the edges of the support to apply them to the rear face of said support; and
    fastening said flattened borders to the rear face of the support.

8. The method of assembling a padded cover according to claim 7, wherein the flattened borders are stapled to the rear face of the rigid support.

* * * * *